United States Patent
Gerhards et al.

(10) Patent No.: US 9,615,709 B2
(45) Date of Patent: Apr. 11, 2017

(54) VACUUM CLEANER AND METHOD FOR OPERATING A VACUUM CLEANER

(75) Inventors: Manfred Gerhards, Euskirchen (DE); Peter Rode, Euskirchen (DE)

(73) Assignee: MIELE & CIE. KG, Guetersloh (DE)

( * ) Notice: Subject to any disclaimer, the term of this patent is extended or adjusted under 35 U.S.C. 154(b) by 873 days.

(21) Appl. No.: 13/327,788

(22) Filed: Dec. 16, 2011

(65) Prior Publication Data
US 2012/0152285 A1    Jun. 21, 2012

(30) Foreign Application Priority Data
Dec. 21, 2010    (EP) ..................................... 10401220

(51) Int. Cl.
*A47L 9/28*    (2006.01)
(52) U.S. Cl.
CPC ........... *A47L 9/2805* (2013.01); *A47L 9/2821* (2013.01); *Y02B 40/82* (2013.01)
(58) Field of Classification Search
CPC .. A47L 2201/00; A47L 9/2805; A47L 9/2842; A47L 9/2857; A47L 9/2889; A47L 9/2821
USPC .................................................. 15/319, 339
See application file for complete search history.

(56) References Cited

U.S. PATENT DOCUMENTS

| | | | | | |
|---|---|---|---|---|---|
| 5,286,301 | A | * | 2/1994 | Albrecht | 134/8 |
| 5,881,430 | A | * | 3/1999 | Driessen et al. | 15/319 |
| 6,023,814 | A | * | 2/2000 | Imamura | 15/339 |
| 2007/0151068 | A1 | * | 7/2007 | Zahuranec et al. | 15/319 |
| 2010/0300489 | A1 |  | 12/2010 | Schulz et al. | |

FOREIGN PATENT DOCUMENTS

| | | |
|---|---|---|
| DE | 102007057589 A1 | 6/2009 |
| DE | 102008010068 A1 | 8/2009 |

OTHER PUBLICATIONS

European Patent Office, European Search Report in European Patent Application No. 10 40 1220 (May 23, 2011).

\* cited by examiner

*Primary Examiner* — Robert Scruggs
(74) *Attorney, Agent, or Firm* — Leydig, Voit & Mayer, Ltd.

(57) ABSTRACT

A vacuum cleaner includes a drive unit configured to generate a suction air stream, a vacuum attachment, a separator device disposed between the vacuum attachment and the drive unit and a control unit. The control unit is configured to influence an input power to the drive unit as a manipulated variable so as to control the suction power at the vacuum attachment as the controlled variable. The suction power at the vacuum attachment is controllable at a predefined level.

11 Claims, 4 Drawing Sheets

VACUUM CLEANER AND METHOD FOR OPERATING A VACUUM CLEANER

CROSS REFERENCE TO RELATED APPLICATION

This application claims priority to European Patent Application No. 10 401 220.8, filed Dec. 21, 2010, which is hereby incorporated by reference herein in its entirety.

FIELD

The present invention relates to a vacuum cleaner including a drive unit for generating a suction air stream, a vacuum attachment, a separator device disposed between the vacuum attachment and the drive unit, and a control unit which influences the input power to the drive unit as the manipulated variable. The present invention also relates to a method for operating such a vacuum cleaner.

BACKGROUND

Conventional vacuum cleaners are operated with a drive unit which is controlled in an open-loop manner. The drive unit is generally the motor of a suction fan. An input power is set for the drive unit or motor, either as a fixed power level or one which is variable by the user via a selector, and is controlled via a voltage level, for example, by means of phase control. The set input power is then obtained for a specific operating point on the flow rate-vacuum curve, and it changes when the vacuum or flow rate changes because of operating conditions. The reasons for this may be different types of floor covering or a reduced throughput of air when the separator device, in particular, a dust bag, is full.

In order to prevent the flow rate from decreasing when the dust bag is full, it some vacuum cleaners include a flow rate control system. In the case of very dense floor coverings, the throughput of air decreases rapidly and, therefore, the flow rate is very difficult to control at the desired level.

German Patent Application DE 10 2007 057 589 A1 describes a flow rate control system with superimposed push force control for a vacuum cleaner. The control unit alternatively accesses a first pressure sensor in the area of the floor nozzle and a second pressure sensor between the dust bag receptacle and the motor.

German Patent Document DE 10 2008 010 068 describes a vacuum cleaner where the suction power at the suction nozzle is intended to be maintained approximately constant. To this end, two pressure sensors are used to provide measured values for two-stage pressure control.

Two pressure sensors are also used in a vacuum cleaner described in U.S. Pat. No. 5,881,430.

While it is indeed important for the user of a vacuum cleaner to limit the force required to push the floor nozzle, it may be more important that the suction power at the vacuum attachment remain as constant as possible. In order to ensure that sufficient suction power can be provided even when the dust bag is filled to its maximum capacity, a high power input must be selected for the drive unit. However, when the dust bag is empty, this high input power is generally excessive and counterproductive, because it operates at high vacuum levels and has corresponding disadvantages in terms of energy consumption.

SUMMARY

In an embodiment, the present invention provides a vacuum cleaner including a drive unit configured to generate a suction air stream, a vacuum attachment, a separator device disposed between the vacuum attachment and the drive unit and a control unit. The control unit is configured to influence an input power to the drive unit as a manipulated variable so as to control the suction power at the vacuum attachment as the controlled variable. The suction power at the vacuum attachment is controllable at a predefined level.

BRIEF DESCRIPTION OF THE DRAWINGS

Exemplary embodiments of the present invention are described in more detail below with reference to the schematic depictions shown in the drawings, in which.

DETAILED DESCRIPTION

In an embodiment, the present invention provides a vacuum cleaner which overcomes the aforementioned disadvantages and is energy-efficient and easy to use.

Advantages of embodiments of the present invention include the control unit allowing the input power to the drive unit to be influenced in such a way that the suction power at the vacuum attachment is used as the controlled variable and is controllable at a predefined level. In this manner, a desired suction power level, particularly a constant suction power level, can be achieved at least in one operating range. Thus, the user does not experience any loss in suction power as the separator device fills or when operating conditions change.

In particular, it is advantageous if the magnitude of the suction power level can be influenced by the user via an input device. This allows adaptation to different individual operating conditions. It is then also advantageous if the maximally settable suction power level corresponds to a value which would be reached without feedback control when the separator device is filled to its maximum capacity. Because of this, the user will encounter unchanged operating conditions even shortly before the dust bag is filled to its maximum capacity.

Advantageously, the suction power at the vacuum attachment can be monitored by two sensors, the first sensor being disposed upstream of the separator device, and the second sensor being disposed downstream of the separator device. This results in a simple design. In addition, the second sensor can then be disposed at a point in the transition region between a dust collection chamber and a fan chamber, where the throughput of air is good and, therefore, well-analyzable sensor signals can be expected. However, in principle, the second sensor could also be disposed upstream of the separator device, such as, for example, in the suction hose or at its point of attachment. It is convenient to use differential-pressure sensors. It is advantageous, in particular, if the first sensor is disposed in the area of a housing accommodating the separator device, a compensating device associated with the control unit compensating for the pressure drop between the vacuum attachment and the mounting position of the first sensor. By mounting the first sensor in the housing of the vacuum cleaner, the signal lines between the control unit (which is typically integrated into the control electronics) and the sensor are short, which, in particular, eliminates the need for signal lines to be routed into the area of the vacuum attachment through a possibly used hose/wand combination. The compensation of the pressure drop between the vacuum attachment and the mounting position of the first sensor is advantageous because it prevents corruption of the controlled variable.

The control system of the present invention can be used to advantage especially when a dust bag is used as the separator device.

Figure 1:
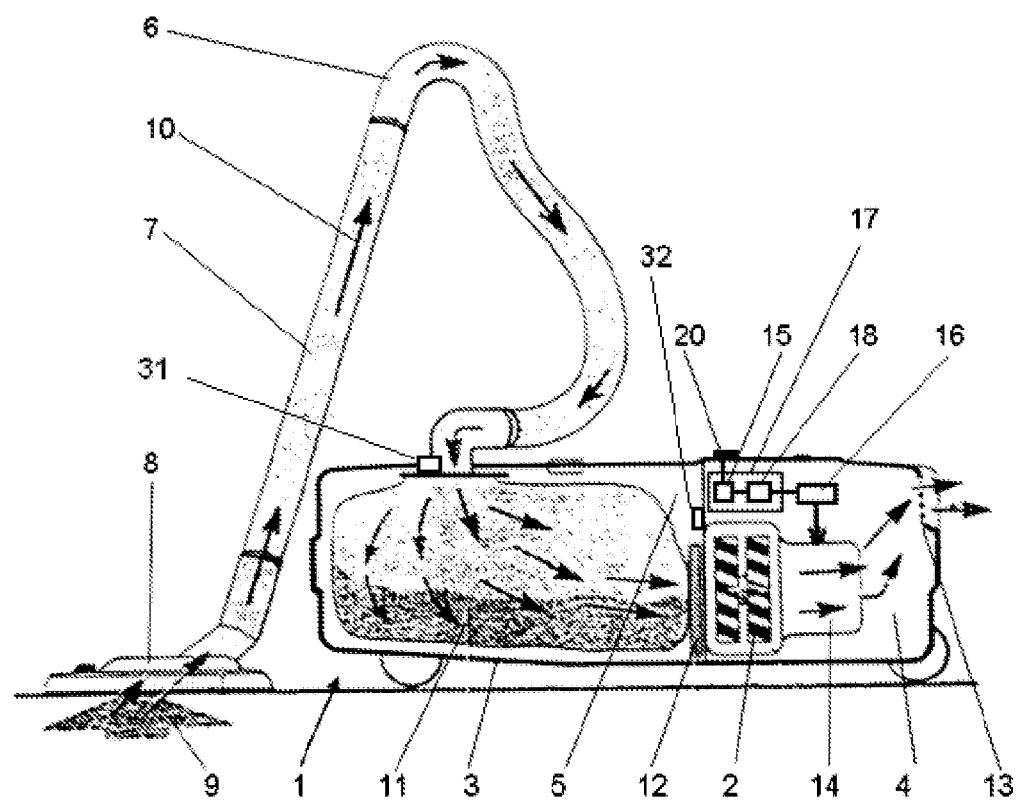
FIG. 1 is a longitudinal cross-sectional view of a vacuum cleaner.

FIG. 1 shows, in schematic form, a vacuum cleaner 1 designed as a canister vacuum cleaner. In principle, however, the present invention is suitable for any vacuum cleaner 1 equipped with a drive unit for generating a suction air stream. Other examples not shown include stick vacuum cleaners, uprights, or robot vacuum cleaners. The vacuum cleaner 1 shown includes a housing 3, which is divided into a fan chamber 4 and a dust collection chamber 5. Fan chamber 4 contains the drive unit, which takes the form of a motor-driven suction fan 2 and is arranged with its suction side facing dust collection chamber 5 where it generates a vacuum which is delivered through a connected suction hose 6 and a suction wand 7 to the suction opening of a vacuum attachment in the form of a floor nozzle 8. Thus, air laden with dust 9 (symbolized by arrows 10) is drawn in from the surface being vacuumed and is cleaned by dust separators which, in this exemplary embodiment, include a dust bag 11 and, arranged downstream thereof, a motor filter 12 and an exhaust filter 13. The cleaned air is then discharged into the environment. Fan motor 14 is controlled by a control unit 15 which forms part of a microprocessor control unit 17 symbolized by a box. Control unit 15 controls power semiconductor devices 16 to thereby influence the input power P1 to fan motor 14. Microprocessor control unit 17 is in communication with a user control and display unit 20 shown in FIG. 2 and further includes a compensating device 18, whose function will be explained later. Moreover, the vacuum cleaner is equipped with two sensors 30 and 31. Sensor 30, an analog pressure sensor, measures the differential pressure between the ambient pressure and the pressure in the region of attachment of suction hose 6 to dust collection chamber 5. Sensor 31 is designed as a pilot probe and located downstream of the motor filter in the region of a filter holder.

Figure 2:
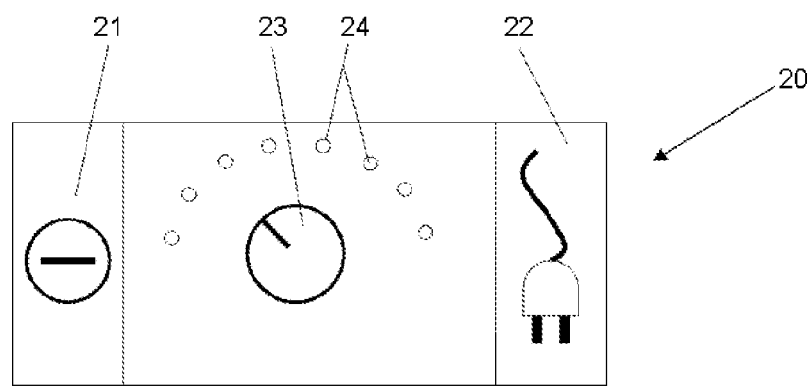
FIG. 2 is a view showing a control panel of a vacuum cleaner according to FIG. 1.

FIG. 2 shows user control and display unit 20. An ON/OFF switch 21 and a cord retractor button 22 are disposed at the sides. In the center, there is a rotary switch 23 with which different power levels 24 can be selected (power selection). Rotary switch 23 and the electronic control unit 15 operated as a function of its setting are means for operating the drive unit (suction fan 2) below its maximum input power.

Figure 3:
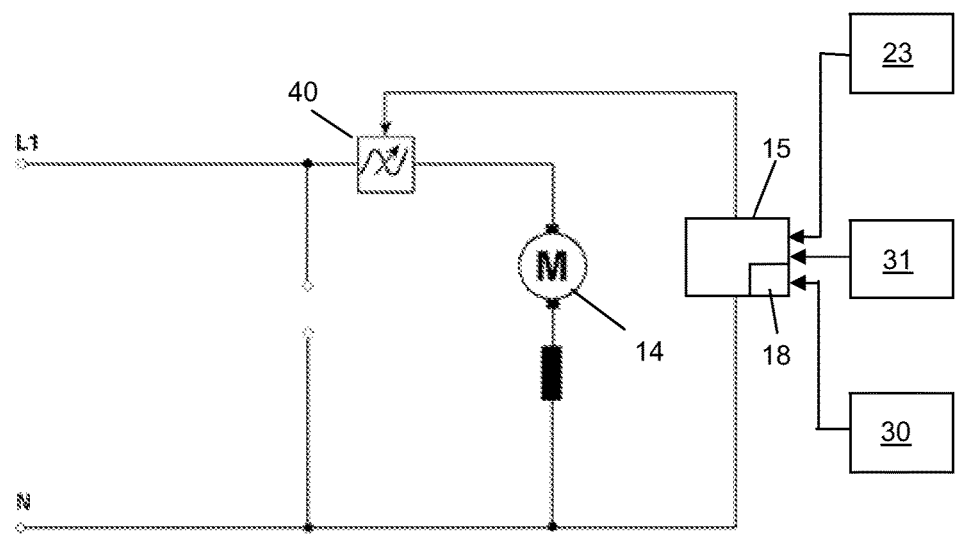
FIG. 3 is a schematic diagram of the control unit and the associated functional components.

FIG. 3 shows, in schematic form, control unit 15 and the associated functional components. Control unit 15 receives as input signals the measured values from the two sensors 30 and 31. The vacuum measured by sensor 30 in the region of attachment of suction hose 6 to dust collection chamber 5 is corrected by the flow-rate-dependent pressure drop in suction hose 6 and suction wand 7 in order for the control unit to receive the vacuum at the vacuum attachment (here floor nozzle 8) as a first input variable. To this end, there is provided compensating device 18, which converts the measured values of sensor 31 into values which correspond to the vacuum at floor nozzle 8. This would be eliminated if the pressure were measured locally in floor nozzle 8, but additional wiring to floor nozzle 8 would be required, which can be avoided by the compensation according to the present invention. The flow resistance in suction hose 6 and suction wand 7 causes a substantially flow-rate-dependent pressure loss. By measuring the flow rate, the pressure loss occurring in suction hose 6 and suction wand 7 at a particular point in time can be calculated and taken into account by means of characteristic curves, tables or functions stored in the control unit. The pilot probe (sensor 31) near fan 2 measures the differential pressure between the static and dynamic pressure drop. This differential pressure correlates to the flow rate in the region of sensor 31. Examples of other conceivable and realizable embodiments include a hot wire, a pressure connection at the fan, an acoustic anemometer or the derivation of the flow rate from the characteristic curves of the motor. Control unit 15 calculates the suction power P2 at the vacuum attachment (floor nozzle 8) from the vacuum in the region of floor nozzle 8 and the flow rate, and uses the calculated suction power P2 as the controlled variable. The reference variable; i.e., the suction power selected as the setpoint P2$v$, can be influenced by the user via rotary switch 23, which is described in greater detail later herein in connection with FIGS. 4 and 5. Control unit 15 varies input power P1 to fan motor 14 as the manipulated variable by phase control of the mains voltage (L1, N).

Figure 4:
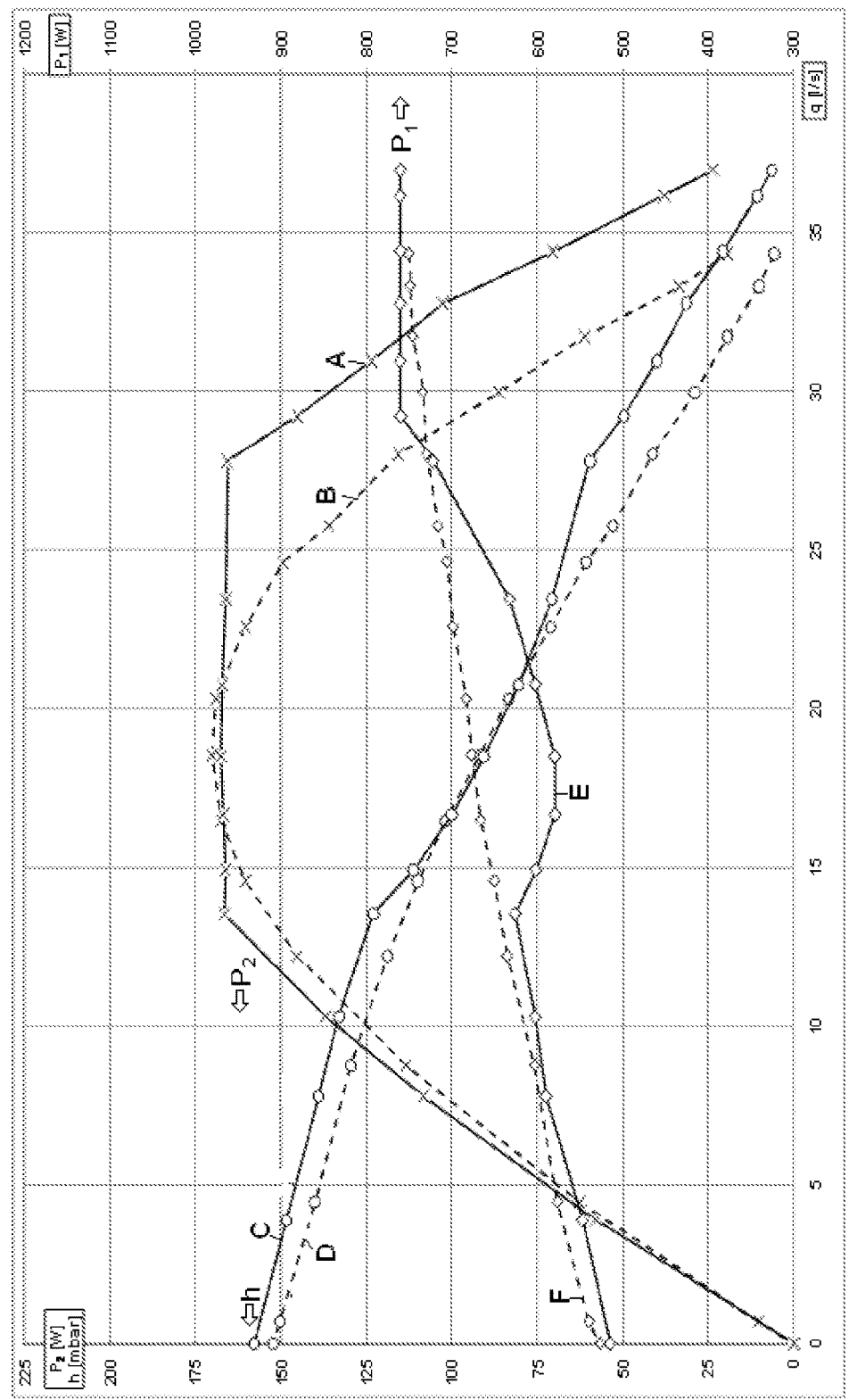
FIGS. 4 and 5 are diagrams of characteristic curves.
Figure 5:
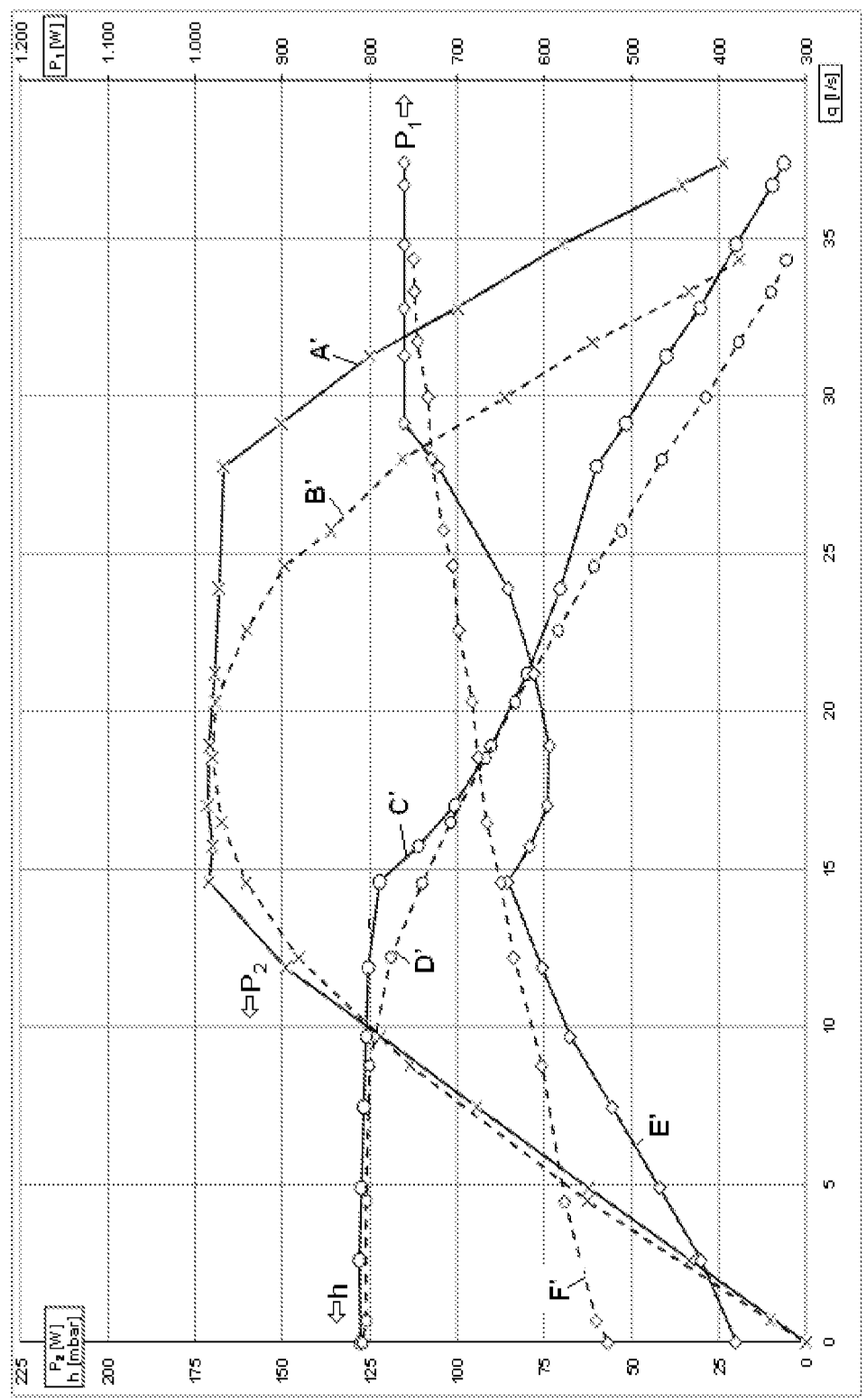

FIGS. 4 and 5 show diagrams comparing two characteristic curves of the same canister vacuum cleaner provided with the control system of the present invention. The solid-line curves belong to a series of measurements made with an empty dust bag 11, while the dashed-line curves belong to a similar series of measurements, made with dust bag 11 filled to its maximum capacity (400 g standard dust). The meaning of the characteristic curves and their indices is as follows:

A, A', B, B': suction power P2 [W] delivered at the floor nozzle
C, C', D, D': vacuum at the floor nozzle h [mbar]
E, E', F, F': drawn electric power P1 [W]

Curves B and B' represent the suction power P2 as a function of the flow rate, as obtained for a full dust bag. In the case of the vacuum cleaner measured, a maximum of about 170 W was reached at a flow rate of q=18 l/s. Corresponding curves would also be obtained for vacuum cleaners which do not have the suction power control of the present invention. Curves A and A' are obtained with an empty dust bag. This is where the suction power control of the present invention comes into play. The obtained suction power P2 is adjusted to a limit value P2$v$max. This value is set as a reference value by control unit 15. In the operating range which corresponds to a flow-rate-range of from q=13 l/s to about 29 l/s, the delivered suction power P2 is therefore maintained at 170 W, which is the value that would be reached without feedback control when the dust bag is filled to its maximum capacity (see curves B and B'). To this end, the associated curve E, respectively E', (input power P1) is influenced in this region according to the control parameters. All other states between a completely empty bag and one filled to its maximum capacity yield curves which lie between curve A, respectively A', and curve B, respectively B', and which are also adjusted.

Curves C and C' represent the resulting vacuum h created at the floor nozzle. In contrast, curves D and D' represent the resulting vacuum that is created at the floor nozzle when the dust bag is filled to its maximum capacity.

The input power that is drawn when the dust bag is filled to its maximum capacity is correspondingly linked to F and F'.

In the diagram shown in FIG. 5, an additional vacuum limitation is implemented in the control loop for vacuum curve to prevent the vacuum from exceeding a certain threshold (here 130 mbar). Thus, the curve is also influenced in the region q<13 l/s through additional intervention in the control of P1.

The diagrams were recorded at a maximum power level set by the user via rotary switch 23. By reducing the power level, reference value P2$v$ is reduced accordingly. As a result, the maximum suction power P2$v$max obtainable when the bag is filled to its maximum capacity is indeed no longer reached, but this is also no longer the intention of the user. Accordingly, in contrast to conventional vacuum cleaners, it is not the input power P1, but the suction power P2$v$ that is selected by the user via rotary switch 23 and maintained constant in the operating range by the control unit. The operating range corresponds to a flow-rate range which is obtained on conventional floor coverings when moving an attached floor nozzle. The flow-rate values outside the operating range are obtained when the nozzle is lifted off the floor or when it is clogged.

While the invention has been particularly shown and described with reference to preferred embodiments thereof, it will be understood by those skilled in the art that various changes in form and details may be made therein without departing from the spirit and scope of the invention.

What is claimed is:

1. A vacuum cleaner comprising:
   a drive unit configured to generate a suction air stream;
   a vacuum attachment;
   a separator device disposed between the vacuum attachment and the drive unit;
   a sensor configured to measure one or more parameters that directly correspond to a flow rate of the suction air stream; and
   a control unit configured to influence an input power to the drive unit as a manipulated variable so as to control the suction power at the vacuum attachment as the controlled variable based on the measured one or more parameters that directly correspond to the flow rate of the suction air stream so that the suction power at the vacuum attachment is controllable at a predefined level.

2. The vacuum cleaner recited in claim 1, wherein the control unit is operable to control the suction power at the vacuum attachment so as to maintain a constant suction power level within an operating range.

3. The vacuum cleaner recited in claim 2, wherein a magnitude of the suction power level is controllable by a user input device.

4. The vacuum cleaner recited in claim 3 wherein a maximum settable suction power level corresponds to a suction power that is reachable without feedback control when the separator device is filled to a maximum capacity.

5. The vacuum cleaner recited in claim 1, further comprising wherein the sensor is part of a pair of first and second sensors configured to monitor the suction power at the vacuum attachment, the first sensor being disposed upstream of the separator device and the second sensor being disposed downstream of the separator device.

6. The vacuum cleaner recited in claim 5, wherein the first and second sensors include differential sensors.

7. The vacuum cleaner recited in claim 5, wherein the vacuum cleaner is a canister vacuum cleaner.

8. The vacuum cleaner as recited in claim 7, wherein the first sensor is disposed in an area of a housing accommodating the separator device, and further comprising a compensating device associated with the control unit and configured to compensate for a pressure drop between the vacuum attachment and a mounting position of the first sensor.

9. The vacuum cleaner recited in claim 5, wherein the first sensor is disposed in an area of a housing accommodating the separator device, and further comprising a compensating device associated with the control unit and configured to compensate for a pressure drop between the vacuum attachment and a mounting position of the first sensor.

10. The vacuum cleaner as recited in claim 1, wherein the separator device includes a dust bag.

11. A vacuum cleaner comprising:
    a drive unit configured to generate a suction air stream;
    a vacuum attachment;
    a separator device disposed between the vacuum attachment and the drive unit;
    a sensor configured to measure one or more parameters that directly correspond to a flow rate of the suction air stream; and
    a control unit configured to influence an input power to the drive unit as a manipulated variable so as to control the suction power at the vacuum attachment as the controlled variable based on the measured one or more parameters that directly correspond to the flow rate of the suction air stream so that the suction power at the vacuum attachment is controllable at a predefined level,
    wherein the sensor is a pilot tube configured to measure differential pressure between a static and dynamic pressure of the suction air stream.

\* \* \* \* \*